United States Patent
Sperger

(10) Patent No.: US 10,370,778 B2
(45) Date of Patent: Aug. 6, 2019

(54) RECYCLING OF MAN-MADE CELLULOSIC FIBERS

(71) Applicant: LENZING AG, Lenzing (AT)

(72) Inventor: Christian Sperger, Schörfling (AT)

(73) Assignee: LENZING AKTIENGESELLSCHAFT, Lenzing (AT)

( * ) Notice: Subject to any disclaimer, the term of this patent is extended or adjusted under 35 U.S.C. 154(b) by 38 days.

(21) Appl. No.: 15/545,899

(22) PCT Filed: Feb. 3, 2016

(86) PCT No.: PCT/AT2016/000006
§ 371 (c)(1),
(2) Date: Jul. 24, 2017

(87) PCT Pub. No.: WO2016/123643
PCT Pub. Date: Aug. 11, 2016

(65) Prior Publication Data
US 2018/0002836 A1   Jan. 4, 2018

(30) Foreign Application Priority Data
Feb. 6, 2015 (AT) .................................... A 58/2015

(51) Int. Cl.
*D01D 5/06* (2006.01)
*D01F 2/06* (2006.01)
(Continued)

(52) U.S. Cl.
CPC ................ *D01F 13/02* (2013.01); *C08B 1/08* (2013.01); *C08B 9/00* (2013.01); *C08B 16/00* (2013.01);
(Continued)

(58) Field of Classification Search
CPC ..... C08B 1/08; C08B 9/00; D01D 5/06; D01F 2/06; D01F 13/02
(Continued)

(56) References Cited

U.S. PATENT DOCUMENTS 2,184,586 A   12/1939   Donagemma
2,647,891 A    8/1953   Warburton
(Continued)

FOREIGN PATENT DOCUMENTS

AT   287905      2/1971
AT   401 779 B  11/1996
(Continued)

OTHER PUBLICATIONS

G. Uçar, et al., "Accurate determination of the limiting viscosity number of pulps," Wood Sci. Technol., 38, pp. 139-148 (2004).
(Continued)

*Primary Examiner* — Leo B Tentoni
(74) *Attorney, Agent, or Firm* — Venable LLP

(57) ABSTRACT

A process for producing a man-made cellulosic molded body using a man-made cellulosic raw material, including the steps of forming a cellulose solution by dissolution of cellulosic raw material, the extrusion of the cellulose solution obtained to form a molded body, and coagulation and regeneration of the cellulose to obtain the man-made cellulosic molded body, wherein the man-made cellulosic raw material is mixed with a second cellulosic raw material prior to forming the cellulose solution.

15 Claims, 1 Drawing Sheet

(51) Int. Cl.
  *D01F 13/02* (2006.01)
  *C08B 1/08* (2006.01)
  *C08B 9/00* (2006.01)
  *C08J 11/04* (2006.01)
  *D01F 2/08* (2006.01)
  *C08B 16/00* (2006.01)

(52) U.S. Cl.
  CPC ............... *C08J 11/04* (2013.01); *D01F 2/08* (2013.01); *C08J 2301/02* (2013.01); *Y02P 70/627* (2015.11)

(58) Field of Classification Search
  USPC ...... 264/37.28, 37.29, 37.3, 37.32, 188, 914
  See application file for complete search history.

(56) References Cited

U.S. PATENT DOCUMENTS

| | | | |
|---|---|---|---|
| 3,758,457 | A | 9/1973 | Broeck, Jr. et al. |
| 3,817,983 | A | 6/1974 | TenBoreck, Jr. et al. |
| 3,914,130 | A | 10/1975 | Newcomer |
| 4,145,533 | A | 3/1979 | Farrall |
| 5,024,831 | A | 6/1991 | Kurisaki et al. |
| 5,064,950 | A | 11/1991 | Okuma et al. |
| 5,227,022 | A | 7/1993 | Leonhardt et al. |
| 5,331,801 | A | 7/1994 | Heifetz |
| 5,369,861 | A | 12/1994 | Ball et al. |
| 5,447,603 | A | 9/1995 | Michalowski et al. |
| 5,481,864 | A | 1/1996 | Wright |
| 5,589,125 | A | 12/1996 | Zikeli et al. |
| 5,601,767 | A | 2/1997 | Firgo et al. |
| 5,609,676 | A | 3/1997 | von der Eltz |
| 5,795,488 | A | 8/1998 | Kalt et al. |
| 6,010,594 | A | 1/2000 | Henricson et al. |
| 6,093,355 | A | 7/2000 | Newbery et al. |
| 6,183,865 | B1 | 2/2001 | Yabuki et al. |
| 6,527,987 | B1 | 3/2003 | Yabuki et al. |
| 6,833,187 | B2 | 12/2004 | Luo et al. |
| 9,133,570 | B2 | 9/2015 | Lightman |
| 9,163,095 | B2 | 10/2015 | Innerlohinger et al. |
| 2001/0050153 | A1 | 12/2001 | Wajer et al. |
| 2002/0037407 | A1 | 3/2002 | Luo et al. |
| 2002/0081428 | A1 | 6/2002 | Luo et al. |
| 2002/0124366 | A1 | 9/2002 | Hirsch |
| 2004/0131690 | A1 | 7/2004 | Lynch |
| 2006/0144534 | A1 | 7/2006 | Paren et al. |
| 2007/0249774 | A1 | 10/2007 | Guzauskas |
| 2008/0003429 | A1 | 1/2008 | Luo et al. |
| 2010/0139875 | A1 | 6/2010 | Paren et al. |
| 2010/0209708 | A1 | 8/2010 | Braun et al. |
| 2010/0297445 | A1 | 11/2010 | Guentherberg et al. |
| 2014/0041821 | A1 | 2/2014 | Graveson et al. |
| 2014/0182801 | A1 | 7/2014 | Hawkins et al. |
| 2015/0136346 | A1 | 5/2015 | Bogren et al. |
| 2015/0291762 | A1 | 10/2015 | Watanabe et al. |
| 2016/0237171 | A1 | 8/2016 | Manner et al. |
| 2016/0237619 | A1 | 8/2016 | Weilach et al. |
| 2016/0257806 | A1 | 9/2016 | Haubl et al. |
| 2016/0326671 | A1 | 11/2016 | Schrempf et al. |
| 2016/0369456 | A1 | 12/2016 | Flynn et al. |

FOREIGN PATENT DOCUMENTS

| | | |
|---|---|---|
| AT | 515 152 A1 | 6/2015 |
| CN | 102199310 A | 9/2011 |
| CN | 102660791 A | 9/2012 |
| CN | 102677230 A | 9/2012 |
| DE | 2321829 | 4/1973 |
| DE | 4118899 C1 | 6/1991 |
| EP | 0 356 419 B1 | 12/1992 |
| EP | 0 584 318 B1 | 5/1996 |
| EP | 0 781 356 B1 | 7/1998 |
| EP | 0 717 131 B1 | 11/1998 |
| EP | 0 671 492 B1 | 9/1999 |
| EP | 1873302 A2 | 1/2008 |
| EP | 2 589 689 A2 | 5/2013 |
| GB | 685843 A | 1/1953 |
| JP | 08239504 | 9/1996 |
| WO | 01/04075 A1 | 1/2001 |
| WO | 02/057319 A2 | 7/2002 |
| WO | 2004/043329 A2 | 5/2004 |
| WO | 2007/070904 A1 | 6/2007 |
| WO | 2009/036480 A1 | 3/2009 |
| WO | 2009/037146 A1 | 3/2009 |
| WO | 2009/065891 A1 | 5/2009 |
| WO | 2010/071910 A2 | 7/2010 |
| WO | 2011/077446 A1 | 6/2011 |
| WO | 2011/130276 A2 | 10/2011 |
| WO | 2013/006876 A1 | 1/2013 |
| WO | 2015/077807 A1 | 6/2015 |

OTHER PUBLICATIONS

K. Götze, "Chemiefasern nach dem Viskoseverfahren," Staple Fibers, 3rd Edition, vol. 1, pp. 670-672 (1967).

International Preliminary Report on Patentability, PCT/AT2016/000006, dated Aug. 8, 2017 (7 pages).

International Search Report, PCT/AT2016/000006, dated May 19, 2016 (5 pages).

M. Abu-Rous et al., "Visualisation of the Nano-Structure of Tencel® (Lyocell) and Other Cellulosic as an Approach to Explaining Functional and Wellness Properties in Textiles", Lenzinger Berichte 85 (2006), pp. 31-37.

Gericke et al., "Functional Cellulose Beads: Preparation, Characterization, and Applications", Chemical Reviews, 113, (2013) pp. 4812-4836.

Trygg et al., "Physicochemical Design of the Morphology and Ultrastructure of Cellulose Beads", vol. 93, Issue 1, (2013) pp. 294-299.

M. Opietnik et al., "TENCEL® Gel—A Novel Cellulose Micro Suspension", Lenzinger Berichte 91 (2013), pp. 89-92.

L. Youhanan, "Enviommental Assessment of Textile Material Recovery Technique: Examining Textile Flow in Sweden", (2013) p. 18-19.

Zhang et al., "Structure and Properties of Regenerated Cellulose Films Prepared from Cotton Linters in NaOH/Urea Aqueous Solution", Ind. Eng. Che. Res., 40, pp. 5923-5928 (2001).

Roder et al., "Comparative Characteristics of Man-Made Regenerated Cellulose Fibres," Lenzinger Berichte, 87, pp. 98-105 (2009).

Bjorquist et al., "Textile qualities of regenerated cellulose fibers from cotton waste pulp" Textile Research Journal, pp. 1-8 (2017).

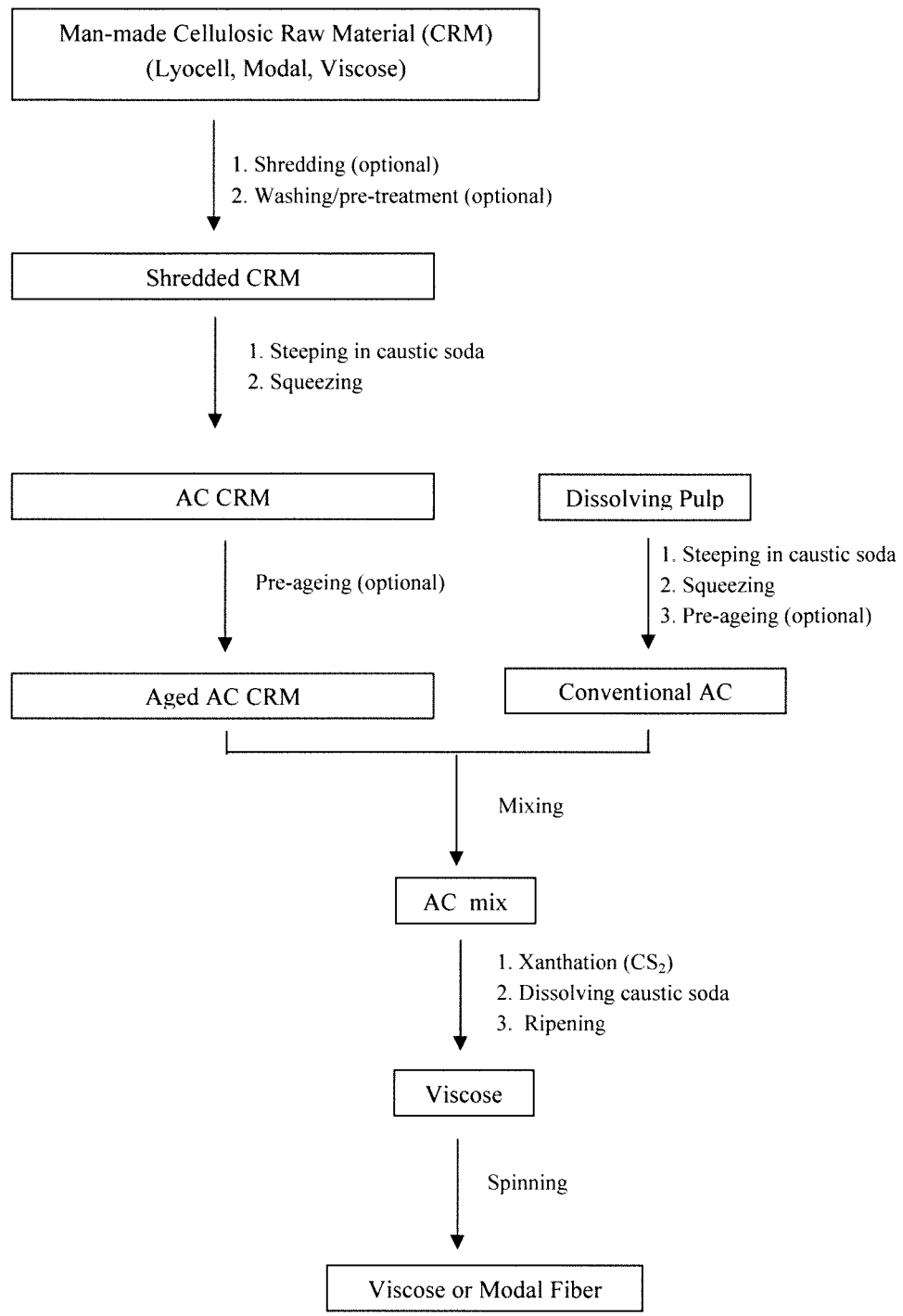

RECYCLING OF MAN-MADE CELLULOSIC FIBERS

The present application is a national-stage entry under 35 U.S.C. § 371 of International Patent Application No. PCT/AT2016/000006, published as WO 2016/123643, filed Feb. 3, 2016, which claims priority to Austrian Patent Application No. A 58/2015 filed Feb. 6, 2015, the entire disclosure of each of which is incorporated by reference herein.

BACKGROUND OF THE INVENTION

Field of the Invention

This invention provides a process for producing a man-made cellulosic molded body using a man-made cellulosic raw material, including the steps of forming a cellulose solution by dissolution of cellulosic raw material, the extrusion of the cellulose solution obtained to form a molded body and the coagulation and regeneration of the cellulose to obtain the man-made cellulosic molded body, wherein the man-made cellulosic raw material is mixed with a second cellulosic raw material prior to forming the cellulose solution. The products thus obtained are high quality regenerated cellulosic molded bodies from recycled waste, suitable for textile and nonwoven manufacturing.

DESCRIPTION OF RELATED ART

State of the Art

U.S. Pat. No. 4,145,533 describes a method for recycling of regenerated cellulose scrap such as uncoated cellophane and rayon from the viscose process. In this process the cellulosic scrap is first shredded before emulsion xanthation in aqueous sodium hydroxide solution and carbon disulfide between 18° C. and 30° C. The so prepared scrap viscose is then blended up to 15% by weight with conventional production viscose to produce regenerated cellulose products. The emulsion xanthation solution contains initially approximately 10.8% by weight of sodium hydroxide and at least 40% by weight carbon disulfide based on the weight of cellulose. Up to 8% by weight of the total cellulose in the mixture derived from scrap cellulose. In addition the solution contains surfactants or emulsifier. This process needs two independent complete alkalization and xanthation lines.

U.S. Pat. No. 2,184,586 claims a process to convert waste regenerated cellulose into cellulose xanthate. The waste threads originating from the production of rayon are in the first step treated with a sodium hydroxide solution at a concentration of 16% to 17.5% for an hour to an hour and a half. After wringing the soaked fibers disintegration was performed in crushers for two hours at 18° C. to 29° C. previous to a ripening step for 25 to 35 hours. Xanthation was performed with 7 liters of carbon disulfide per 100 kg of alkali cellulose for 1.5 to 2 hours. After dissolving 100 kg of the xanthate in 130 liters of 0.4% to 0.5% caustic soda a viscose spinning dope suitable for spinning was obtained. The polymerization degree of the thus obtained fibers is generally too low to give good mechanical fiber properties.

The patents U.S. Pat. Nos. 3,914,130 and 3,817,983 both describe the application of different cellulosic materials including regenerated cellulose for the preparation of viscose. They claim a process where ball-milled cellulosic materials were added to conventionally prepared alkali cellulose made of pulp prior to or after ageing. The so prepared alkali cellulose is further processed as described in U.S. Pat. No. 3,817,983 by the classical viscose process to form viscose. The resulting viscose may be used for molding into a sponge, casting into a film or forming a fiber but the polymerization degree of the thus obtained fibers is generally too low to give good mechanical fiber properties.

The WO 2007/070904 presents a process to prepare vat dyed cellulosic fibers or films using cellulosic raw materials that already contain vat dyes in molecular disperse form in addition to at least one more cellulosic raw material. The cellulosic raw materials may be selected from pulp, natural or man-made cellulosic fibers or spinning waste from fiber production. But this document is completely silent about any problems caused by the use of such spinning waste or about how to solve them.

None of the previously described recycling options include any chemical pre-treatment processes of the reclaimed man-made cellulosic raw material before being used in the viscose process nor shows a possibility to use large amounts of reclaimed man-made cellulosic raw materials to obtain cellulosic molded bodies with good mechanical properties.

Moreover, the usability of reclaimed man-made cellulosic raw material may be limited due to the fact that textiles, besides cellulose, typically contain additional chemicals such as dyes, resins, optical brighteners etc. and may further become contaminated during their lifetime by e.g. softeners or bleaching agents during washing. Also significant amounts of metals can be found in both pre- and post-consumer cotton waste materials. These metals may originate from abrasions of buttons or zips.

The presence of any of these chemicals potentially hinders respectively restricts the application of the reclaimed man-made cellulosic raw material in the Viscose process. As an example, resins chemically interconnect cellulose molecules making them insoluble and unreactive. These substances cannot be removed from the reclaimed man-made cellulosic raw material by simple mechanical disintegration steps of the man-made cellulosic raw material.

However, these chemicals may cause high particle contents in the spinning dopes that require higher filtration efforts resulting in increasing equipment costs and lower productivity. If the particle content is too high, the filtration system may have reduced stability times and may in the worst case even become completely blocked. Additionally, large amounts of small particles that cannot be removed from the spinning dope by filtration can cause problems at the spinnerets due to clogging of single spinneret holes and thereby reduced life times of the spinnerets, leading again to lower productivity and/or lower quality fibers.

Problem

In view of this state of the art the problem to be solved was to provide a process which allows the use of as high as possible amounts of reclaimed man-made cellulosic raw material for the production of man-made cellulosic molded bodies, thereby providing a pathway for efficient recycling of man-made cellulosic raw material into high quality products suitable for e.g. textile and nonwoven manufacturing.

BRIEF DESCRIPTION OF THE DRAWINGS

FIG. 1 is an exemplary flow diagram of a process in accordance with the present invention.

DESCRIPTION OF THE INVENTION

This problem was solved by a process for producing a man-made cellulosic molded body using a reclaimed man-made cellulosic raw material and a virgin cellulosic raw material, including the steps of
  a) optionally mechanically shredding of the reclaimed man-made cellulosic raw material,
  b) optionally pre-treating the reclaimed man-made cellulosic raw material in a metal removing stage, a decoloring stage and/or cross linker removing stage prior to the alkalization step
  c) in an alkalization stage steeping the reclaimed man-made cellulosic raw material in caustic soda and subsequently squeezing,
  d) pre-aging the thus obtained alkali cellulose,
  e) xanthation of the alkali cellulose in a xanthation step and subsequently dissolution of the cellulose xanthate,
  f) extruding the cellulose xanthate solution thus obtained to form a molded body,
  g) coagulating and regenerating the cellulose to obtain the man-made cellulosic molded body,
wherein before step e) in an additional combination step the alkali cellulose made of the reclaimed man-made cellulosic raw material is combined with alkali cellulose made of the virgin cellulosic raw material in a second alkalization line and wherein the combined alkali celluloses are further processed jointly in the xanthation step e).

The mechanically shredding step a) includes—whenever applicable—milling steps, if the raw material contains larger aggregates, fabrics, etc. and opening steps, e.g. if the material comes in compressed bales, as well as other steps necessary to comminute the raw material into a particle size which is suitable to perform the following process steps in a suitable way.

In or before the optional pretreating step b) raw material fiber blends have to be separated to remove non-cellulosic fiber impurities prior to alkalization. There are well-known processes in the art to do this, mostly depending on the nature of the non-cellulosic fiber impurities.

The xanthation of the alkali cellulose in a xanthation step and subsequently dissolution of the cellulose xanthate in step e) can be done by the known viscose or modal process; the composition (cellulose content, Alkali content, . . . ) of the viscose depends on the type and quality of the final product which should be produced.

For the purpose of this invention the term "man-made cellulosic raw material" includes all types of man-made cellulosic fibers produced by the viscose, modal or lyocell process. The raw material may contain dulling agents (e.g. TiO2) without affecting the process according to the invention. Colorless or colored raw materials may be used, as well. If desired, dyestuff can be removed by known dyestuff-selective decoloring procedures. Metals, as for instance magnesium, may cause problems in the filterability of the viscose and should preferentially be removed by an acidic pre-treatment step, by the aid of a complexing agent or a combination of both. In case of cross linked cellulosic raw materials it is required to remove the respective cross linker prior to the alkalization step. This can be done for instance for cross linkers of the urea type (e.g. DMDHEU) by acidic or alkaline hydrolytic cleaving procedures described in the literature (e.g. Textile Research Journal, 1985, 55, 444-448). Preferably the reclaimed material should not contain cross-linked cellulosic materials. This may be analyzed by e.g. elementary analysis, online IR spectrometry, the Kjeldahl procedure (Zeitschrift für Analytische Chemie, 1883, 366-382) or other methods which are in principle known by the expert skilled in the art.

In case the raw material contains non-cellulosic materials, for example in the case of a fiber blend (e.g. blend with polyester), the non-cellulosic fibers have to be quantitatively removed prior to the alkalization step by state of the art methods. In order to keep the starting quality, in particular the average molecular weight of the man-made cellulosic raw material as high as possible, mild and non-cellulose-destructive methods are preferred for any required pre-treatment.

In a preferred embodiment of the process according to the invention the reclaimed man-made cellulosic raw material was obtained from pre- and/or post-consumer waste containing man-made cellulosic fibers produced by the viscose-, modal or lyocell process.

In a preferred embodiment of the process according to the invention the pre- and/or post-consumer waste additionally contained non-cellulosic fibers and these non-cellulosic fibers have to be quantitatively separated from the reclaimed man-made cellulosic raw material prior to the alkalization step. This separation can be done by methods generally well-known in the art.

In a further preferred embodiment of the process according to the invention the metal removing stage is an acidic washing treatment and/or a treatment with a complexing agent. The complexing agent preferably is applied as an aqueous solution.

In an even further preferred embodiment of the process according to the invention an acidic washing treatment and a treatment with a complexing agent in the metal removing stage are combined in one step by adding a complexing agent to the acidic washing treatment.

The optional decoloring stage according to the invention is performed depending on the type of dyestuff by methods generally well-known in the art. In the optional cross linker removing stage the cross linker, most probably being of the urea type, can be removed by an acidic or alkaline step.

Preferably in the process according to the invention the molded body produced by the inventive process is a staple fiber, filament fiber, sponge or foil of the Viscose or Modal type. Resulting molded bodies are preferably used for further processing into textile or nonwoven products.

In a particularly preferred embodiment of the process according to the invention the difference between the limiting viscosity numbers (GVZ) of the alkali cellulose of the reclaimed man-made cellulosic raw material and the alkali cellulose of virgin cellulosic raw material is equal to or lower than 30 ml/g, preferably lower than 10 ml/g. In another preferred embodiment of the present invention the required viscosities of the two alkali celluloses prior to mixing are mainly depending on the desired product type and quality as well as on the share of the man-made cellulosic raw material in the final product.

Preferably in the process according to the invention the reclaimed man-made cellulosic raw material is a staple fiber, filament fiber, sponge or foil of the Viscose or Modal type or of the Lyocell type.

In a preferred embodiment in the combination step the share of the reclaimed man-made cellulosic raw material is from 10 to 90%, preferably from 20 to 80%, most preferably from 40 to 60%, always expressed as weight-% referring to pure cellulose, while the remaining share is virgin cellulosic raw material.

Detailed Description of the Process According to the Invention (See Also the Flow Scheme in FIG. 1):

Man-Made Cellulosic Raw Material ("CRM") consisting of 100% man-made cellulosic raw material like Lyocell-, Modal- or Viscose as fibers or textiles (pre- or post-consumer) are first shredded; the man-made cellulosic raw materials may be dull or bright, colored or contain other chemicals from previous processes.

An optional pre-treatment step for instance to remove metals, soft finish or other chemicals may be performed if required by known methods in advance to the alkalization step. Cross linkers may be removed by alkaline or acidic conditions or other procedures known from the literature (e.g. Textile Research Journal, 1985, 55, 444-448). Preferentially cross linked cellulosic materials should be avoided.

The removal of metals may be done by the aid of a complexing agent or a combination of such steps.

The acidic washing treatment according to the current invention may be performed at pH-values between 1.5 and 5, preferably between 2 and 3 at temperatures between room temperature to 100° C., preferably between 50 to 70° C. for 15 to 120 min, preferably 15 to 60 min.

Metal removal according to the current invention may also be performed by treating the reclaimed cellulosic raw material by an aqueous solution of a complexing agent. Preferably, the concentration of the complexing agent in said aqueous solution is lower than 5 kg per ton of oven dried pulp (odtp), and especially preferred below 2 kg/odtp. The treatment of the man-made cellulosic waste material with an aqueous solution of a complexing agent may be conducted at temperatures between room temperature to 100° C., preferably between 50 to 80° C. for 15 to 120 min, preferably 15 to 90 min.

The acidic washing step and the treatment with an aqueous solution of a complexing agent may be combined in one process step, by adding the complexing agent to the acidic washing liquor.

If desired, dyestuff may also be removed in this step by applying dyestuff-selective decolorizing procedures.

The minimum viscosity of the cellulosic raw materials after shredding and other applied washing steps and/or pre-treatments depends on the fiber type to be produced (Viscose or Modal), the desired fiber quality and the required share of the cellulosic man-made raw material in the product. Preferentially the viscosity of the reclaimed fibers prior to the alkalisation step should be at least on the level of the AC from conventional pulp after pre-aging or higher. The preferred viscosity, expressed as GVZ ("Grenzviskositätszahl"=German for "limiting viscosity number") in the unit [ml/g], will be greater than 380 ml/g for Modal- and greater than 220 ml/g for Viscose-fibers, respectively. A low share of the cellulosic man-made raw material in the final product may also enable a lower viscosity level of the reclaimed raw material than that of the AC from conventional dissolving pulp without negatively affecting the quality of the final product; hence the viscosity of the AC CRM shall preferentially be not less than 80% of the GVZ of the dissolving pulp. The shredded CRM then will be steeped in caustic soda (according to patent AT 287905) and subsequently squeezed to obtain the respective alkali cellulose ("AC CRM").

After the steeping step an optional pre-aging step of the AC CRM (by state of the art procedures) may follow: ageing time and temperature are—depending on the starting viscosity (GVZ) of the CRM—adjusted in the way that the difference between the limiting viscosity numbers of the alkali cellulose of the reclaimed man-made cellulosic raw material (AC CRM) and the alkali cellulose of virgin cellulosic raw material (the conventionally prepared AC from dissolving pulp) is equal to or lower than 30 ml/g, preferably lower than 10 ml/g after pre-aging; in case of mixtures with standard dissolving pulp lower or higher viscosity levels than AC from conventional dissolving pulp are possible (depending on mixing ratio and the desired quality of the final product). The required viscosity level also depends on the requirements and type of the final product. For instance, a viscose fiber requires a lower AC viscosity (GVZ from 220 to 280 ml/g) compared to a high quality Modal fiber (GVZ from 300 to 400 ml/g). In all cases the average viscosity of the final AC, either from pure reclaimed raw materials or respective mixtures with conventional dissolving pulp, should be preferentially between 380 and 470 ml/g for Modal and between 240 and 300 ml/g for Viscose. In case of a given viscosity of the AC made from reclaimed cellulosic material below 380 ml/g for Modal respectively 240 ml/g for Viscose, the preferred average viscosity level of the mixture (between 380 and 450 ml/g for Modal and between 240 and 300 ml/g for Viscose) may be adjusted by a respective higher viscosity of the AC from conventional dissolving pulp of a given mixing ratio or the desired average viscosity level of the AC mixture may be adjusted by adjusting the mixing ratio.

As a first example: If 80% conventional AC and 20% AC CRM with GVZ 350 ml/g should be mixed to obtain a target viscosity of 420 ml/g of the mixture, then the GVZ of conventional AC has to be adjusted to ~438 ml/g. As a second example: if conventional AC with GVZ 450 ml/g and AC CRM with GVZ 400 ml/g should be mixed to obtain an average viscosity of the AV of 420 ml/g, then the mixing ratio has to be 40% conventional AC and 60% AC CRM).

As the viscosity level of AC CRM and conventional AC from dissolving pulp are normally not on the same viscosity level, the pre-aging step of the AC CRM and the AC from conventional pulp have to be performed according to the invention separately in two parallel lines or alternatively—in another preferred embodiment of the invention—in only one ageing device. In the latter embodiment, the AC CRM may be added to the ageing device at a later stage than the conventional AC. This has to be done in the way that the AC CRM fulfills the required dwell time to obtain the desired final viscosity. From an economical point of view this makes sense in case of a low share of AC CRM below 10% in the final AC mixture.

The share of pre-aged AC CRM in the final AC mixture may vary in the range from 1 to 99%, calculated on pure cellulose. The application of AC CRM is not restricted to mixtures with AC from dissolving pulp but may also be used in pure form. For logical reasons the ratio of AC CRM and conventional AC in mixtures may be adjusted to make good economic sense (>10% AC CRM, calculated on pure cellulose) in case of a second AC preparation line. Alternatively, especially in case of a share of AC CRM below 10% the AC CRM may be added to the conventional AC in the ageing device at a later stage in order to fulfil the required dwell time necessary to adjust the viscosity level of AC CRM. In case of two different AC preparation lines mixing may be performed directly in the xanthation device in case of only one AC line mixing happens in the ageing device anyway.

The mixture of AC CRM and conventional AC ("AC mix") is then converted into the spinning dope by the viscose process as known in the art, in particular by the steps of treating the AC mix with carbon disulfide
dissolving the xanthate in caustic soda solution
ripening of the viscose solution and finally
deaeration of the spinning dope.

The cellulose concentration of the final viscose respective modal spinning dope may be adjusted in such a way that the viscosity level, measured as ballfall viscosity, may be in the range of from 60 to 100 s for Viscose and 80 to 150 s for Modal production. The cellulose content for producing viscose shall be 8 to 10% by weight, related to pure cellulose in the final spinning dope; for producing Modal it shall be 5-8%. Especially if high amounts of reclaimed cellulosic material with low viscosity are used as raw material, the cellulose concentration in the final spinning dope may be increased to the upper concentration in order to obtain the respective ballfall viscosity of the final spinning dope as basis for a good fiber quality.

Depending on the composition of the spinning dope (cellulose concentration, alkali content) and the respective precipitation bath (spinbath) different cellulosic bodies can be prepared, e.g. Modal- or viscose fibers, films, molded compounds, sponges, etc; detailed process descriptions for the manufacture of viscose fibers can be found in Gotze, "Chemiefasern nach dem Viskoseverfahren", 3rd edition, 1967; a detailed process description for the manufacture of Modal fibers can be found in Austrian patent AT 287905.

Reclaimed man-made cellulosic raw material containing colored cellulosic fibers can easily be used for applications where color is not relevant, like in fibers for isolation, fillers, etc.

EXAMPLES

The invention will now be illustrated by examples. These examples are not limiting the scope of the invention in any way. The invention includes also any other embodiments which are based on the same inventive concept.

Example 1: Use of 70% Recycled Viscose Fibers for the Manufacture of Viscose Fibers Bright Viscose staple fibers were first mechanically shredded and subsequently extracted with EtOH in order to remove soft finish from the fibers. Steeping of the shredded viscose fibers was performed in caustic soda previous to squeezing. The AC with a GVZ viscosity of 185 ml/g was then mixed, without any pre-aging, with 30% of an AC prepared from conventional dissolving pulp (Lenzing standard pulp) to obtain a viscosity of the AC mixture of 225 ml/g. The viscose spinning dope after xanthation, dissolving and ripening consisted of 9.19% cellulose and had a ballfall viscosity of 47 sec. The properties of the spun viscose fibers are shown in table 1.

Example 2: Use of 100% Recycled Modal Fibers for the Manufacture of Viscose Fibers The viscose spinning dope made from bright Modal fibers as raw material was prepared in the same way as described in Example 1 without pre-aging of the respective AC with a viscosity of 231 ml/g. The respective viscose spinning dope, containing 9.17% cellulose with a ballfall viscosity of 50 sec, was then spun into viscose fibers with the fiber properties shown in table 1.

Example 3: Use of 100% Recycled Lyocell Fibers for the Manufacture of Modal Fibers Bright, 6 mm short cut Lyocell fibers were pre-treated and subsequently converted into the respective AC according to Example 1 with an AC viscosity of 371 ml/g without pre-aging. The subsequently prepared modal spinning dope, containing 6.15% cellulose with a ballfall viscosity of 75 sec was then spun into modal fibers with the properties shown in table 1.

Example 4: Use of 20% Recycled Lyocell Fibers for the Manufacture of Modal Fibers Lyocell fibers were converted into the respective AC according to example 3. The AC with a GVZ viscosity of 382 ml/g was subsequently mixed without pre-aging with 80% of conventional AC from Lenzing internal dissolving pulp to obtain a viscosity of the AC mixture of 412 ml/g. After converting the AC mixture into a modal viscose (6.08% cellulose, ballfall viscosity 82 sec) the viscose was spun into modal fibers with properties summarized in table 1.

Example 5: Use of 10% Recycled Lyocell Fabric (Blue) for the Manufacture of Modal Fibers A blue colored fabric consisting of 100% Lyocell was mechanically shredded and then, without any further pre-treatment, directly converted into the respective AC according to Example 4. The freshly obtained "Lyocell-AC", having an AC viscosity of 340 ml/g without pre-aging, was then mixed with conventional AC from Lenzing internal dissolving pulp in a ratio of 10% "Lyocell-AC" and 90% "pulp-AC" to obtain an AC mixture with a viscosity of 455 ml/g. The AC mixture was further converted into a modal spinning dope (6.06% cellulose, ballfall viscosity 98 sec) according to Example 3 to obtain, after spinning, Modal fibers with properties shown in table 1.

Example 6: Use of 55% Recycled Lyocell Fabric (Blue) for the Manufacture of Modal Fibers The process according to the invention was performed in the same way as described in Example 5 but with an AC blend of dissolving pulp and Lyocell fibers in a ratio of 55% "Lyocell-AC" and 45% "pulp-AC" The viscosity of the "Lyocell-AC" was 332 ml/g, the viscosity of the AC mixture was 432 ml/g. The AC mixture was further converted into a modal spinning dope, containing 5.99% cellulose with a ballfall viscosity of 83 sec, according to Example 3. The obtained Modal fiber properties are shown in table 1.

Example 7: Use of 20% Recycled Lyocell Dull for the Manufacture of Viscose Fibers Dull Lyocell fibers (dulling agent TiO2) were converted into the respective AC according to example 1. The "Lyocell AC" was pre-aged to a GVZ viscosity of 235 ml/g and was mixed in a share of 20% to an AC from Lenzing internal dissolving pulp to obtain a viscosity of the mixture of 230 ml/g. The respective viscose spinning dope after xanthation, dissolving and ripening contained 8.88% cellulose with a ballfall of 57 sec. The viscose fiber properties are shown in table 1.

Example 8: Comparative; Use of 100% Lenzing Internal Dissolving Pulp for the Manufacture of Viscose Fibers Viscose fibers were manufactured in the same way as in example 1, differing only in the kind of the raw material: The same dissolving pulp was used in all examples for producing viscose fibers. The obtained viscose fiber properties are shown in table 1.

Example 9: Comparative; Use of 100% Lenzing Internal Dissolving Pulp for the Manufacture of Modal Fibers Modal fibers were manufactured in the same way as in example 2, differing only in the kind of the raw material: The same dissolving pulp was used in all examples for producing Modal. The obtained Modal fiber properties are shown in table 1.

Examples 3 to 6 impressively show that the invention presented here enables the production of high-quality fibers using large shares of recycled material. Such fibers according to the invention are showing properties comparable to those made from regular dissolving pulp.

TABLE 1

| Example | Raw Material | Product | Titer [dtex] | Tenacity [cN/tex] | Elongation [%] | Working Performance [cN/tex] |
|---|---|---|---|---|---|---|
| 1 | 100% bright Viscose | Viscose | 1.37 | 27.42 | 17.67 | 486 |
| 2 | 100% bright Modal | Viscose | 1.35 | 27.33 | 18.14 | 504 |
| 3 | 100% bright Lyocell | Modal | 1.31 | 37.77 | 12.67 | 479 |
| 4 | 20% bright Lyocell, 80% pulp | Modal | 1.29 | 37.27 | 12.22 | 455 |
| 5 | 10% blue Lyocell, 90% pulp | Modal | 1.29 | 37.90 | 14.20 | 538 |
| 6 | 55% blue Lyocell, 45% pulp | Modal | 1.30 | 36.95 | 12.92 | 477 |
| 7 | 20% dull Lyocell, 80% pulp | Viscose | 1.36 | 24.07 | 20.31 | 491 |
| 8 (comp) | 100% pulp | Viscose | 1.34 | 26.99 | 17.20 | 464 |
| 9 (comp) | 100% pulp | Modal | 1.38 | 32.73 | 14.08 | 461 |

The invention claimed is:

1. A process for producing a man-made cellulosic molded body using a reclaimed man-made cellulosic raw material and a virgin cellulosic raw material, comprising the steps of:
   a) steeping the reclaimed man-made cellulosic raw material in caustic soda in an alkalization stage and subsequently squeezing to obtain alkali cellulose,
   b) xanthation of the alkali cellulose and subsequently dissolution of cellulose xanthate to obtain a cellulose xanthate solution,
   c) extruding the cellulose xanthate solution,
   d) coagulating and regenerating cellulose to obtain the man-made cellulosic molded body,
   wherein before step b) in an additional combination step the alkali cellulose made of the reclaimed man-made cellulosic raw material is combined with alkali cellulose made of the virgin cellulosic raw material in a second alkalization line and wherein the combined alkali celluloses are further processed jointly in the xanthation step b).

2. The process according to claim 1, wherein the reclaimed man-made cellulosic raw material was obtained from pre- and/or post-consumer waste containing man-made cellulosic fibers produced by the viscose-, modal or lyocell process.

3. The process according to claim 2, wherein the pre- and/or post-consumer waste further comprises non-cellulosic fibers and wherein these non-cellulosic fibers are quantitatively separated from the reclaimed man-made cellulosic raw material prior to step a).

4. The process according to claim 1, further comprising a metal removing stage which comprises an acidic washing treatment and/or a treatment with a complexing agent.

5. The process according to claim 4, wherein the acidic washing treatment and the treatment with a complexing agent in the metal removing stage are combined in one step by adding a complexing agent to the acidic washing treatment.

6. The process according to claim 1, wherein the molded body is a staple fiber, filament fiber, sponge or foil of the Viscose or Modal type.

7. The process according to claim 1, wherein the difference between limiting viscosity numbers of the alkali cellulose of the reclaimed man-made cellulosic raw material and the alkali cellulose of virgin cellulosic raw material is equal to or lower than 30 ml/g.

8. The process according to claim 1, wherein the reclaimed man-made cellulosic raw material is a staple fiber, filament fiber, sponge or foil of the Viscose or Modal type or of the Lyocell type.

9. The process according to claim 1, wherein in the additional combination step a share of the reclaimed man-made cellulosic raw material is from 10 to 90%.

10. The process according to claim 7, wherein the difference between the limiting viscosity numbers of the alkali cellulose of the reclaimed man-made cellulosic raw material and the alkali cellulose of virgin cellulosic raw material is equal to or lower than 10 ml/g.

11. The process according to claim 9, wherein the share of the reclaimed man-made cellulosic raw material is from 20 to 80%.

12. The process according to claim 11, wherein the share of the reclaimed man-made cellulosic raw material is from 40 to 60%.

13. The process according to claim 1, further comprising mechanically shredding the reclaimed man-made cellulosic raw material.

14. The process according to claim 1, further comprising pre-treating the reclaimed man-made cellulosic raw material in a metal removing stage, a decoloring stage and/or cross linker removing stage prior to the alkalization step.

15. The process according to claim 1, further comprising pre-aging the alkali cellulose.

* * * * *